US006549117B1

(12) United States Patent
Kato et al.

(10) Patent No.: US 6,549,117 B1
(45) Date of Patent: Apr. 15, 2003

(54) REMOTE CONTROL SYSTEM FOR A VEHICLE

(75) Inventors: Hironori Kato, Miyagi-ken (JP); Toshiyuki Hoshi, Miyagi-ken (JP); Hideki Masudaya, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/577,866

(22) Filed: May 24, 2000

(30) Foreign Application Priority Data

May 27, 1999 (JP) .......................................... 11-147669

(51) Int. Cl.[7] ................................................ G05B 23/00

(52) U.S. Cl. ................................ 340/5.72; 340/825.69; 340/825.72

(58) Field of Search ....................... 340/825.69, 825.72, 340/5.72

(56) References Cited

U.S. PATENT DOCUMENTS 5,600,323 A 2/1997 Boschini ..................... 341/173
5,661,471 A * 8/1997 Kotlicki ................. 340/825.37
6,243,022 B1 * 6/2001 Furukawa .............. 340/825.72
6,292,107 B1 * 9/2001 Yamaura et al. ....... 340/825.69
6,396,389 B1 * 5/2002 Nakano et al. ............ 340/5.72

* cited by examiner

*Primary Examiner*—Michael Horabik
*Assistant Examiner*—M Shimizu
(74) *Attorney, Agent, or Firm*—Brinks Hofer Gilson & Lione

(57) ABSTRACT

It is an object of the present invention to provide a remote control system for a vehicle wherein the contents of control are changed depending on the distance between the vehicle and a portable transmitter, for example with a locking command signal provided from the portable transmitter in a vehicle invisible state, a window is not closed. According to the present invention, for achieving the above-mentioned object, the portable transmitter transmits both first and second transmission signals together, and when a receiver has received at least the first transmission signal, a control circuit section outputs a first control signal and at this time both a first device (locking/unlocking mechanism) and a second device (window opening/closing mechanism) are operated, while when the receiver has received only the second transmission signal, the control circuit section outputs a second control signal and at this time only the first device is controlled.

4 Claims, 2 Drawing Sheets

REMOTE CONTROL SYSTEM FOR A VEHICLE

BACKGROUND OF THE INVENTION

1. Field of the Invention

The present invention relates to a remote control system for a vehicle and more particularly a remote control system for a vehicle capable of controlling with use of a single portable transmitter a plurality of devices mounted on the vehicle.

2. Description of the Prior Art

Heretofore there has been known a remote control system for a vehicle of the type in which one transmission signal (say, a radio signal) is transmitted from a portable transmitter toward a receiver disposed in the vehicle (automobile) and is received by the receiver to control a device disposed in the vehicle, say, a remote-controlled locking device. By this remote-controlled locking device a control is made to lock a door and at the same time, if a window is open, a remote control for closing the window is also conducted.

In a vehicle equipped with such a control system a person (say, a driver) who holds the portable transmitter can control a plurality of devices disposed in the vehicle simultaneously. Even if the person who holds the portable transmitter forgets to close a window for example and leaves the vehicle, both locking the door and closing the window can be done at a time and that automatically by transmitting a remote lock control signal for locking the door from the portable transmitter to the receiver disposed in the vehicle. This is advantageous in point of theft prevention.

The above conventional remote control system (e.g., a door locking control system) can control the remote control system disposed in the vehicle (automobile) even from a fairly remote place (say, from a distance of about 20 to 30 meters) This means that the control can be made even from such a remote place as the portable transmitter holding person (say, the driver) cannot exactly confirm (visually) the condition of the vehicle (automobile) or even when there is an obstacle (say, another vehicle) between the portable transmitter holding person and the vehicle, making it impossible to see the vehicle directly.

In connection with the above example, if the portable transmitter holding person left the vehicle while leaving goods within the vehicle and transmitted a door lock command signal through the portable transmitter despite of it being impossible to exactly confirm (visually) the condition of the vehicle, and if at this time a window is open and the goods are fallen and project from the open window, not only a locking control is made but also the window is closed automatically and simultaneously. This closure of the window may give rise to the problem that the goods are caught in the window, resulting in the window being not closed or being broken.

The present invention solves the above-mentioned problem and it is an object of the invention to provide a remote control system for a vehicle wherein the contents of control are changed depending on the distance between the vehicle and a portable transmitter and wherein even with a lock command signal provided from the portable transmitter in a vehicle invisible condition for example, windows are not closed automatically.

SUMMARY OF THE INVENTION

The remote control system for a vehicle according to the present invention comprises:

a portable transmitter which transmits first and second transmission signals of different transmission distances together;

a receiver which is disposed in the vehicle and which receives the first and second transmission signals;

a control circuit section which outputs first and second control signals based on the received first and second transmission signals; and first and second devices which are disposed in the vehicle and which are controlled and driven with the first or the second control signal, wherein when the receiver has received at least the first transmission signal, the control circuit section outputs the first control signal and the first and second devices are driven, while when the receiver has received only the second transmission signal, the control circuit section outputs the second control signal and only the first device is driven.

Preferably, the first device is a vehicular door locking/unlocking mechanism and the second device is a window opening/closing mechanism.

Preferably, the transmission distance of the first transmission signal transmitted by the portable transmitter is shorter than that of the second transmission signal transmitted also by the portable transmitter.

Preferably, the first transmission signal transmitted by the portable transmitter is an infrared signal and the second transmission signal transmitted also by the portable transmitter is a radio signal.

DETAILED DESCRIPTION OF A PREFERRED EMBODIMENT

A remote control system for a vehicle according to an embodiment of the present invention will be described hereunder with reference to the accompanying drawings.

Figure 1:
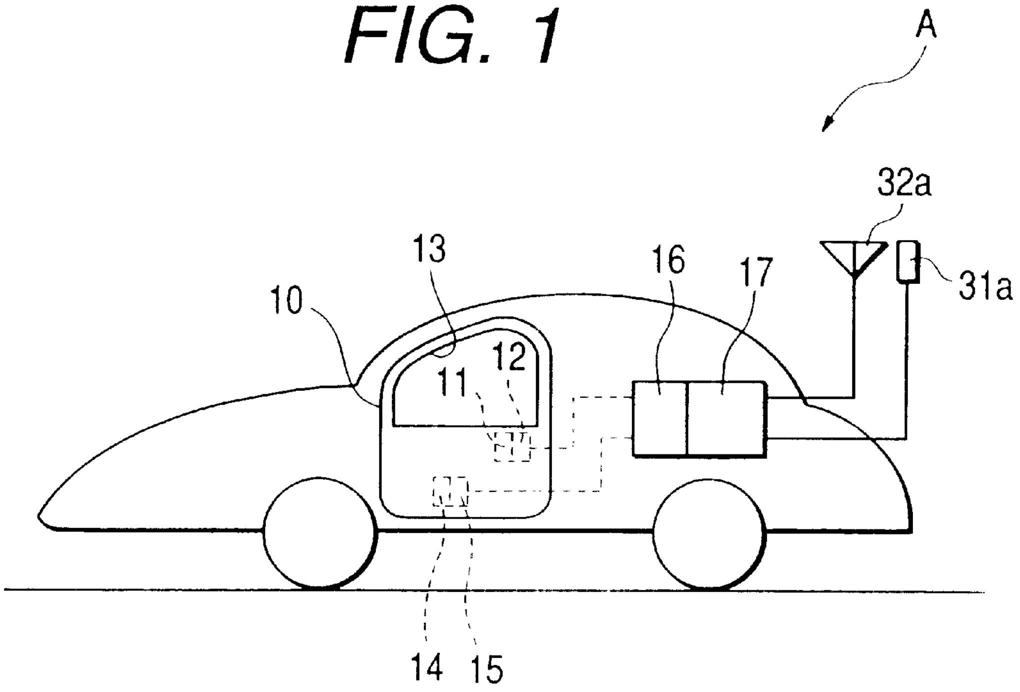
FIG. 1 is an appearance diagram for explaining a remote control system for a vehicle according to an embodiment of the present invention.
Figure 2:
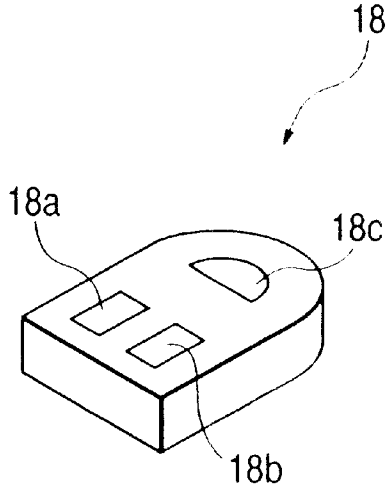
FIG. 2 is a perspective view for explaining a portable transmitter used in the remote control system.

FIG. 1 is an appearance diagram for explaining the remote control system and FIG. 2 is a perspective view showing a portable transmitter used in the remote control system.

In the remote control system for a vehicle according to this embodiment, a remote vehicular door locking/unlocking device is used as the first device and a remote window opening/closing device is used as the second device.

The vehicle, indicated at A, is, for example, a sedan, one-box, or wagon type automobile having doors 10 and windows 13. The doors 10 and the windows 13 are constructed so that they can perform locking/unlocking operations and opening/closing operations in accordance with signals which are generated by depressing push-button switches of a portable transmitter 18 to be described later.

As shown in FIGS. 1 and 2, the remote control system is provided with a door locking/unlocking mechanism 11 (first device) for locking and unlocking each door 10, a lock/ unlock control section 12 which outputs a control signal for actuating the door locking/unlocking mechanism 11, a window opening/closing mechanism 14 (second device) for opening and closing each window 13, a window control section 15 which outputs a control signal for actuating the window opening/closing mechanism 14, a control circuit section 16 which outputs control signals respectively to the lock/unlock control section 12 and the window control section 15, a receiver 17 which outputs a reception signal to the control circuit section 16, and a portable transmitter 18 which transmits a predetermined transmission signal which the receiver 17 can receive.

The portable transmitter 18 capable of being carried, is integral with or connected to an engine key (not shown) and is provided with one or plural push-buttons for transmission, say, first, second and third push-buttons 18*a*, 18*b*, 18*c*. The portable transmitter 18 is further provided with a first transmitter section which transmits at least a first transmission signal (say, an infrared signal) and a second transmitter which transmits a second transmission signal (say, a radio signal).

The first transmission signal is set so as to be transmitted at a relatively short distance (say, 6 meters or so), while the second transmission signal is set so as to be transmitted at a relatively long distance (say, about 20 to 30 meters). Thus, the transmission distance of the first transmission signal is set shorter than that of the second transmission signal.

The first and second transmission signals transmitted from the portable transmitter 18 are for locking and unlocking each door 10 and for opening and closing each window 13 in the vehicle A.

The receiver 17 is attached to the vehicle A at a predetermined position (say, back mirror or door) and is provided with a photodiode 31*a* and a receiving antenna 32*a* for receiving the first transmission signal (say, infrared signal) and the second transmission signal (say, radio signal) both transmitted from the portable transmitter 18. The receiver 17 functions to output (transmit) predetermined signals based on first and second reception signals received by the photodiode 31*a* and the receiving antenna 32*a* respectively.

The control circuit section 16, which is constituted, for example, by a central processing unit (CPU) having a plurality of terminals, is connected to the receiver 17 and is adapted to output a first or second control signal in accordance with which of the first and second transmission signals is received by the receiver 17. More specifically, the control circuit section 16 outputs the first control signal upon input of at least the first transmission signal and outputs the second control signal upon input of only the second transmission signal.

The lock/unlock control section 12 is connected to the control circuit section 16, and in accordance with a drive signal provided from the control circuit section 16, the lock/unlock control section 12 outputs a control signal for locking or unlocking each door 10.

The locking/unlocking mechanism 11 is attached to each door 10 of the vehicle A and functions to lock and unlock the door. It is operated in accordance with a drive signal provided from the lock/unlock control section 12.

The window control section 15 is connected to the control circuit section 16, and in accordance with an output signal provided from the control circuit section 16, the window control section 15 outputs a control signal for closing or opening the window 13.

The window opening/closing mechanism 14 is attached to each door 10 of the vehicle A and functions to close and open the associated window 13. The window opening/closing mechanism 14 is operated upon input thereto of a predetermined control signal which is outputted from the window control section 15.

The portable transmitter and the receiver both used in the remote control system of this embodiment will be described below in detail with reference to FIGS. 3 and 4.

Figure 3:
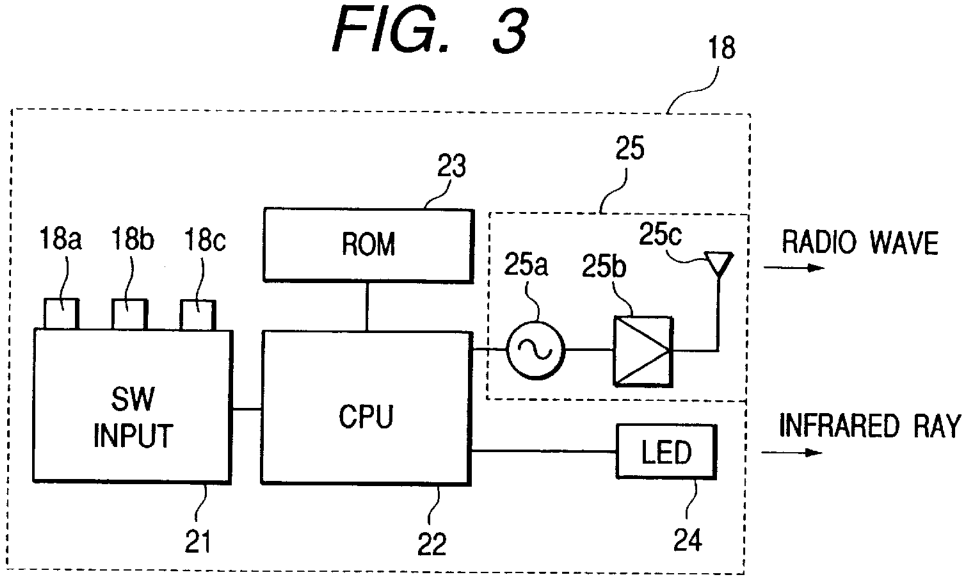
FIG. 3 is a block diagram showing the portable transmitter used in the remote control system.
Figure 4:
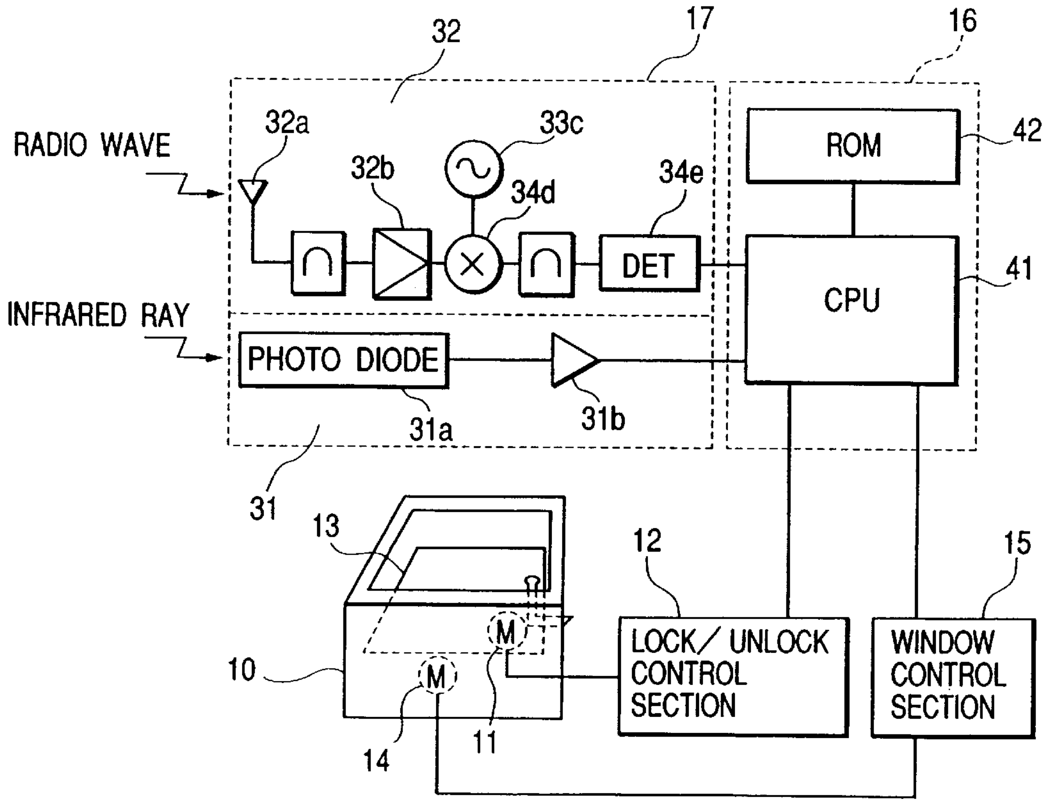
FIG. 4 is a block diagram for explaining a receiver and a control circuit section both used in the remote control system.

FIG. 3 is a block diagram showing the portable transmitter and FIG. 4 is a block diagram for explaining the receiver and the control circuit section, both of a remote control system for a vehicle.

As shown in FIG. 3, the portable transmitter 18 is made up of an operating section 21 constituted of, say, one or plural (say, three) switches, a control section 22 constituted mainly of a central processing unit (CPU), a memory 23 constituted of a ROM for example, a first transmitter section 24 constituted, for example, of an LED which outputs an infrared signal, a second transmitter section 25 composed of an oscillator 25*a*, an amplifier 25*b* and a transmitting antenna 25*c* which are for the transmission of a radio signal for example, and a power supply (not shown).

In the operating section 21 are provided various operating buttons. In this embodiment the first push-button 18*a* is for instructing door locking and window closing, the second push-button 18*b* is for instructing door unlocking, and the third push-button 18*c* is for transmitting a trunk room unlocking signal. In the operating section 21 there may be provided other push-buttons than the first, second and third push-buttons 18*a*, 18*b*, 18*c* to turn ON a room light and effect expansion and contraction of a radio antenna.

In the control section 22 there is created a transmission information signal including both a predetermined identification signal (ID code) stored in the memory 23 and a command information corresponding to an operation performed in the operating section 21. This signal is sent to both first and second transmitter sections 24, 25 and an infrared signal (first transmission signal) of a predetermined wavelength is transmitted from the first transmitter section 24, while in the second transmitter section 25 the signal is converted to a radio signal (second transmission signal) of a predetermined frequency, which radio signal is outputted from an antenna 25*c*.

In this embodiment both infrared signal and radio signal are outputted only upon depression of the first push-button 18*a*, while only the radio signal is outputted upon depression of the second push-button 18*b* and the third push-button 18*c*.

As shown in FIG. 4, the receiver 17 is made up of a first receiving section 31 which receives the infrared signal transmitted from the portable transmitter 18 and a second receiving section 32 which receives the radio signal. For example, the first receiving section 31 is composed of a photodiode 31*a* which receives the infrared signal (first transmission signal) and an amplifier 31*b*, while the second receiving section 32 is composed of a receiving antenna 32*a* for receiving the radio signal (second transmission signal), an amplifier 32*b*, an oscillator 33*c*, a mixer 34*d*, and a detector 34*e*.

The control circuit section 16 is made up of a control section 41 constituted mainly by a central processing unit (CPU) and a memory 42 constituted by a ROM for example. The receiver 17 and the control circuit section 16 are connected together.

When a signal of a predetermined intensity is inputted to both or one of the first and second receiving sections 31, 32 of the receiver 17, the control section 41 in the control circuit section 16 compares an identification signal stored in the memory 42 and command information with the information inputted to the control section 41. Further, in accordance with which of the infrared signal and the radio signal is received, a predetermined control signal (first or second control signal) is outputted from the control section 41. This control signal is inputted to each of the lock/unlock control section 12 and the window control section 15.

The operation of the remote control system according to this embodiment will now be described. It is here assumed that when the driver of the vehicle A leaves the vehicle, each door 10 is in an unlocked state and each window 13 is open.

If the distance between the vehicle A and the portable transmitter 18 which is held and operated by the vehicular driver for example, is a relatively short distance (say, about 5 to 6 meters), then by depressing the first push-button 18*a* for transmission in the portable transmitter, the infrared signal (first transmission signal) and the radio signal (second transmission signal) are outputted from the portable transmitter 18. The infrared signal and radio signal thus outputted are both received by the receiver 17 disposed in the vehicle.

When both first and second transmission signals are received by the receiver 17, the thus-received signals are inputted to the control section 41, which in turn compares each of the inputted signals with an identification signal read from the memory 42 and command information to make sure that the signal is a normal signal, and outputs the first control signal upon making sure of the first transmission signal.

The first control signal outputted from the control section 41 is inputted to both lock/unlock control section 12 and window control section 15. Then, a locking drive signal and a window closing drive signal are outputted from the lock/unlock control section 12 and the window control section 15 to the locking/unlocking mechanism 11 and the window opening/closing mechanism 14 respectively. With these drive signals, the locking/unlocking mechanism 11 is operated to lock the door 10 and the window opening/closing mechanism 14 is operated to close the window.

The following description is now provided about the operation of the remote control system in a state in which the distance between the vehicle A and the portable transmitter 18 is relatively long (say, about 18 to 20 meters), making it difficult to directly see the vehicle A.

In this state, by depressing the first push-button 18*a* for transmission in the portable transmitter 18, the first and second transmission signals are outputted from the portable transmitter 18.

Of the first and second transmission signals thus outputted, the first transmission signal (infrared signal) for which the transmission distance is set relatively short (say, about 6 meters) is not received by the receiver 17 which is positioned outside the transmission distance, while the second transmission signal (radio signal) for which the transmission distance is set relatively long (say, about 20 meters) is received by the receiver 17.

If only the second transmission signal is received by the receiver 17, this received signal is inputted to the control section 41, which in turn compares this received transmission signal with an identification signal read from the memory 42 and command information to make sure that the signal is a normal signal, and outputs the second control signal upon making sure of only the second transmission signal.

The second control signal outputted from the control section 41 is inputted to each of the lock/unlock control section 12 and the window control section 15. A locking drive signal is outputted from the lock/unlock control section 12 to the door locking/unlocking mechanism 11. With this drive signal, the door locking/unlocking mechanism 11 is operated so as to lock the door. At this time the window control section 15 does not output a closing drive signal, so that the window 13 is kept open.

Thus, when the receiver 17 receives only the second transmission signal (radio signal) from the portable transmitter 18, the door 10 is locked, but the window 13 is not closed.

The following description is now provided about the operation of the remote control system in a state in which the distance between the vehicle A and the portable transmitter 18 is relatively short but it is difficult to see the vehicle A directly because of the presence of another vehicle therebetween.

This operation is about the same as the foregoing operation performed when the distance between the vehicle A and the portable transmitter 18 is a relatively long distance (say, about 18 to 20 meters) which makes it difficult to see the vehicle clearly. Therefore, a detailed description thereof will be omitted.

In this condition, that is, if another vehicle is present, the first transmission signal is intercepted by the another vehicle and is not received by the receiver 17 because the first transmission signal provided from the portable transmitter 18 is an infrared ray having a nature of traveling straight ahead. In this state, the second control signal is outputted from the control section 41, so that the window 13 remains open.

Although in the above embodiment it is each window 13 that is opened and closed by the window opening/closing mechanism 14, no limitation is made to the window. It may be a sun-roof that is opened and closed.

In the remote control system for a vehicle according to the present invention, two types of signals of different transmission distances are used as transmission signals transmitted from the portable transmitter, and whether the operating position of the portable transmitter is at a short distance fully permitting confirmation (visual confirmation) of the vehicular condition or is at a long distance difficult to make a visual confirmation of the vehicular condition, is judged according to what type of signal is received by the vehicular receiver. Then, on the basis of this judgment (say, judgment of the distance of the portable transmitter from the vehicle) there are made different controls respectively for the first device (say, door locking control) and the second device (say, window closing control), thus permitting a safe control to be selected and executed in accordance with the transmission distance.

In the remote control system for a vehicle according to the present invention, moreover, since the first and second transmission signals transmitted from the portable transmitter are constituted by an infrared signal and a radio signal, respectively, an obstacle (say, another vehicle or a human) if any between the portable transmitter and the vehicle makes it impossible to positively receive the first transmission signal because the infrared signal has a nature of traveling straight ahead. In this state, the operator of the portable transmitter cannot clearly see the vehicular condition because of the presence of the obstacle. If in this state there is made a control for closing the associated window, there will arise the foregoing problem by mistake. However, since the infrared signal (first transmission signal) is intercepted by the obstacle and cannot be received by the receiver, the window closing control is not performed.

What is claimed is:

1. A remote control system for a vehicle, comprising:

a portable transmitter which transmits first and second transmission signals of different transmission distances together through a single operation of pressing at least one push button on the portable transmitter;

a receiver which is disposed in the vehicle and which receives the first and second transmission signals;

a control circuit section which outputs first and second control signals based on the received first and second transmission signals; and first and second devices which are disposed in the vehicle and which are controlled and driven with at least one of the first and the second control signal, wherein when the receiver has received at least the first transmission signal, the control circuit section outputs the first control signal and the first and second devices are driven, while when the receiver has received only the second transmission signal, the control circuit section outputs the second control signal and only the first device is driven.

2. A remote control system for a vehicle according to claim 1, wherein the first device is a vehicular door locking/unlocking mechanism and the second device is a window opening/closing mechanism.

3. A remote control system for a vehicle according to claim 1, wherein the transmission distance of the first transmission signal transmitted by the portable transmitter is shorter than that of the second transmission signal transmitted also by the portable transmitter.

4. A remote control system for a vehicle according to claim 3, wherein the first transmission signal transmitted by the portable transmitter is an infrared signal and the second transmission signal transmitted also by the portable transmitter is a radio signal.

* * * * *